(12) United States Patent
Cannon et al.

(10) Patent No.: US 8,176,287 B2
(45) Date of Patent: May 8, 2012

(54) LAN-MANAGED STORAGE VOLUME INITIALIZATION FOR LAN-FREE STORAGE OPERATION

(75) Inventors: David M. Cannon, Tucson, AZ (US);
Colin S. Dawson, Tucson, AZ (US);
Barry Fruchtman, Tucson, AZ (US);
Robert G. Labrie, Tucson, AZ (US);
Carol J. Nylund, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1563 days.

(21) Appl. No.: 11/005,381

(22) Filed: Dec. 6, 2004

(65) Prior Publication Data
US 2006/0123068 A1 Jun. 8, 2006

(51) Int. Cl.
*G06F 12/00* (2006.01)
*G06F 12/08* (2006.01)

(52) U.S. Cl. ........ 711/170; 711/151; 711/147; 709/213; 709/218; 709/225; 709/229; 709/249

(58) Field of Classification Search .................. 711/151, 711/170, 147; 709/213, 218, 225, 229, 249
See application file for complete search history.

(56) References Cited

U.S. PATENT DOCUMENTS
2006/0062383 A1* 3/2006 Kaneda et al. .................. 380/28
2007/0130430 A1* 6/2007 Devassy et al. ............... 711/151

OTHER PUBLICATIONS
Microsoft Computer Dictionary, Copyright 1999, Microsoft Press, Fourth Edition, p. 261.*

* cited by examiner

*Primary Examiner* — Midys Rojas
(74) *Attorney, Agent, or Firm* — Kunzler Needham Massey & Thorpe

(57) ABSTRACT

LAN-managed storage volumes are managed by a LAN storage manager installed on a storage management server. In processing a LAN-free storage volume request, the LAN tape manager selects a LAN-managed storage volume responsive to the LAN-free storage volume allocation request wherein the LAN-managed storage volume is initialized as a candidate for a LAN-free storage operation. The LAN-managed storage volume may be initialized by the LAN storage manager as a candidate for a LAN-free storage operation prior to the LAN storage manager receiving the LAN-free storage volume allocation request or in response to the LAN storage manager receiving the LAN-free storage volume allocation request. Additionally, prior to being initialized as a candidate for a LAN-free storage operation, the LAN-managed storage volume may be a pre-existing storage volume or a scratch storage volume.

25 Claims, 8 Drawing Sheets

US 8,176,287 B2

LAN-MANAGED STORAGE VOLUME INITIALIZATION FOR LAN-FREE STORAGE OPERATION

FIELD OF INVENTION

The present invention generally relates to local area network ("LAN") free storage operations (e.g., direct access to storage area network attached devices). The present invention specifically relates to LAN-free storage operations involving tape libraries owned and managed by a mainframe operating system (e.g., z/OS operating system).

BACKGROUND OF THE INVENTION

The z/OS operating system is a highly secure, scalable, high-performance enterprise operating system on which to build and deploy Internet and Java-enabled applications, providing a comprehensive and diverse application execution environment. An introduction of LAN-free storage operation in a z/OS based server requires tape volumes be written to and read by storage agents on a distributed operating system (e.g., AIX, Sun, or WINDOWS). These same tape volumes must also be managed by the z/OS based server for back-end storage-management operations (e.g., data movement within the z/OS based server). A challenge for the computer industry is to efficiently manage access to these tape volumes by both distributed operating systems over a storage area network ("SAN") and the z/OS operating system.

SUMMARY OF THE INVENTION

The present invention provides a new and unique method for processing a LAN-free storage volume allocation request that involves a LAN-free access to a LAN-managed storage volume. For purposes of the present invention, a LAN-free access to a LAN-managed storage volume is broadly defined as a direct access over a storage area network ("SAN") to a storage volume mounted in a SAN-attached storage device (e.g., a SAN tape drive), wherein the mounted storage volume as well as data and the metadata associated with the mounted storage volume are owned and managed by a storage manager (e.g., z/OS server) that receives storage requests over the LAN. For brevity, this storage manager is hereafter referred to as a LAN tape manager. Also, for purposes of the present invention, a LAN-free storage volume allocation request is broadly defined as a request for a storage volume owned and managed by a storage manager (e.g., z/OS server) that receives storage requests over the LAN whereby the storage volume is to be used in a LAN-free storage operation.

One form of the present invention is a signal bearing medium tangibly embodying a program of machine-readable instructions executable by one or more processor(s) to perform operations to process a LAN-free storage volume allocation request. The operations include (1) receiving the LAN-free storage volume allocation request; (2) selecting a LAN-managed storage volume responsive to the LAN-free storage volume allocation request, the LAN-managed storage volume being initialized as a candidate for a LAN-free storage operation; and (3) transmitting information indicative of the selected LAN-managed storage volume responsive to the LAN-free storage volume allocation request.

A second form of the present invention is a system employing one or more processors, and one or more memories for storing instructions operable with the processor(s) for processing a LAN-free storage volume allocation request. The instructions being executed for (1) receiving the LAN-free storage volume allocation request; (2) selecting a LAN-managed storage volume responsive to the LAN-free storage volume allocation request, the LAN-managed storage volume being initialized as a candidate for a LAN-free storage operation; and (3) transmitting information indicative of the selected LAN-managed storage volume responsive to the LAN-free storage volume allocation request.

A third form of the present invention is a server for processing a LAN-free storage volume allocation request. The server employs (1) means for receiving the LAN-free storage volume allocation request; (2) means for selecting a LAN-managed storage volume responsive to the LAN-free storage volume allocation request, the LAN-managed storage volume being initialized as a candidate for a LAN-free storage operation; and (3) means for transmitting information indicative of the selected LAN-managed storage volume responsive to the LAN-free storage volume allocation request.

The forgoing forms and other forms, objects, and aspects as well as features and advantages of the present invention will become further apparent from the following detailed description of various embodiments of the present invention, read in conjunction with the accompanying drawings. The detailed description and drawings are merely illustrative of the present invention, rather than limiting the scope of the present invention being defined by the appended claims and equivalents thereof.

DESCRIPTION OF THE PREFERRED EMBODIMENT

Figure 1:
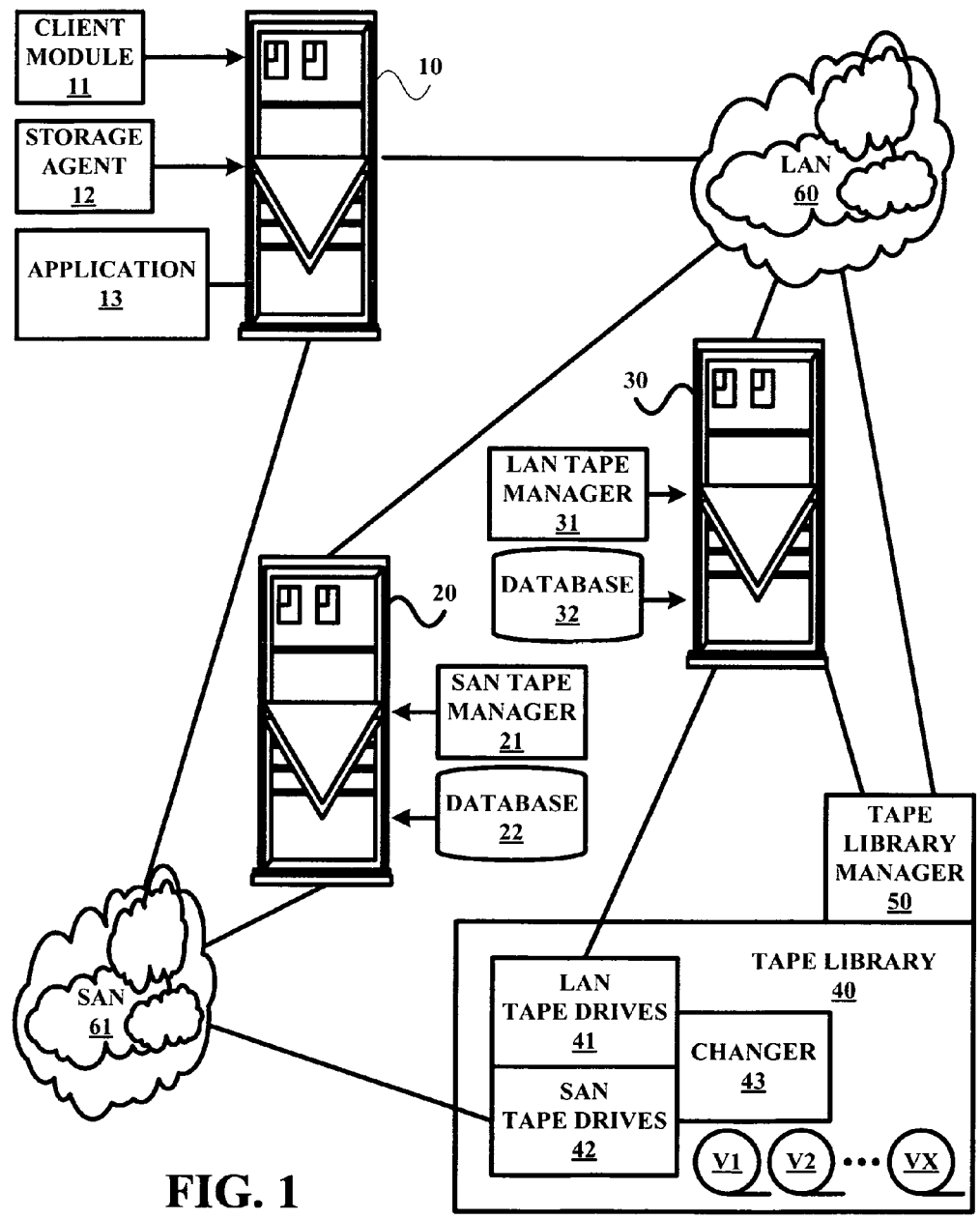
FIG. 1 illustrates an exemplary operational environment for facilitating a LAN-free storage operation in accordance with the present invention.

The present invention provides a static method for initializing storage volumes (e.g., tape volumes) as candidates for future LAN-free storage operations and a dynamic method for initializing storage volumes as a candidate for a current LAN-free storage operation. Generally, as illustrated in FIG. 1, a computer environment for implementing the present invention minimally employs a client file server 10, a SAN tape management server 20, a LAN tape management server 30, a tape library 40, and a tape library manager 50. A client module 11, a storage agent 12 and an application 13 are installed on server 10, which is connected to a LAN 60 and a SAN 61. A SAN tape manager 21 with an associated database 22 are installed on server 20, which is connected to LAN 60 and SAN 61. A LAN tape manager 31 with an associated database 32 are installed on server 30, which is connected to LAN 60, LAN tape drives 41 of tape library 40, and library manager 50. SAN tape drives 42 are connected to SAN 61, and library manager 50 is connected to LAN 60.

To enable server 10 to perform a LAN-free storage operation of data associated with application 13 via SAN 61 to SAN tape drives 42, manager 31 selectively implements a static method for initializing one or more of X number of tape volumes V1-VX of tape library 40 as LAN-free candidates prior to an initiation of the LAN-free storage operation by server 10 or implements a dynamic method for initializing one or more of tape volumes V1-VX as a LAN-free candidate in the course of the LAN-free storage operation by server 10, where X≧1. Specifically, as illustrated in FIGS. 2-5, manager 31 can be commanded to implement a flowchart 70 (FIG. 2) representative of the static storage volume initialization method of the present invention and triggered to implement a flowchart 120 (FIG. 5) representative of the dynamic storage volume initialization method of the present invention. The description of flowcharts 70 and 120 herein is provided in the context of FIG. 1 to facilitate a straightforward understanding of the present invention. Nonetheless, from the description of flowcharts 70 and 120, those having ordinary skill in the art will appreciate the applicability of the present invention to more complex and intensive computer storage environments.

Figure 2:
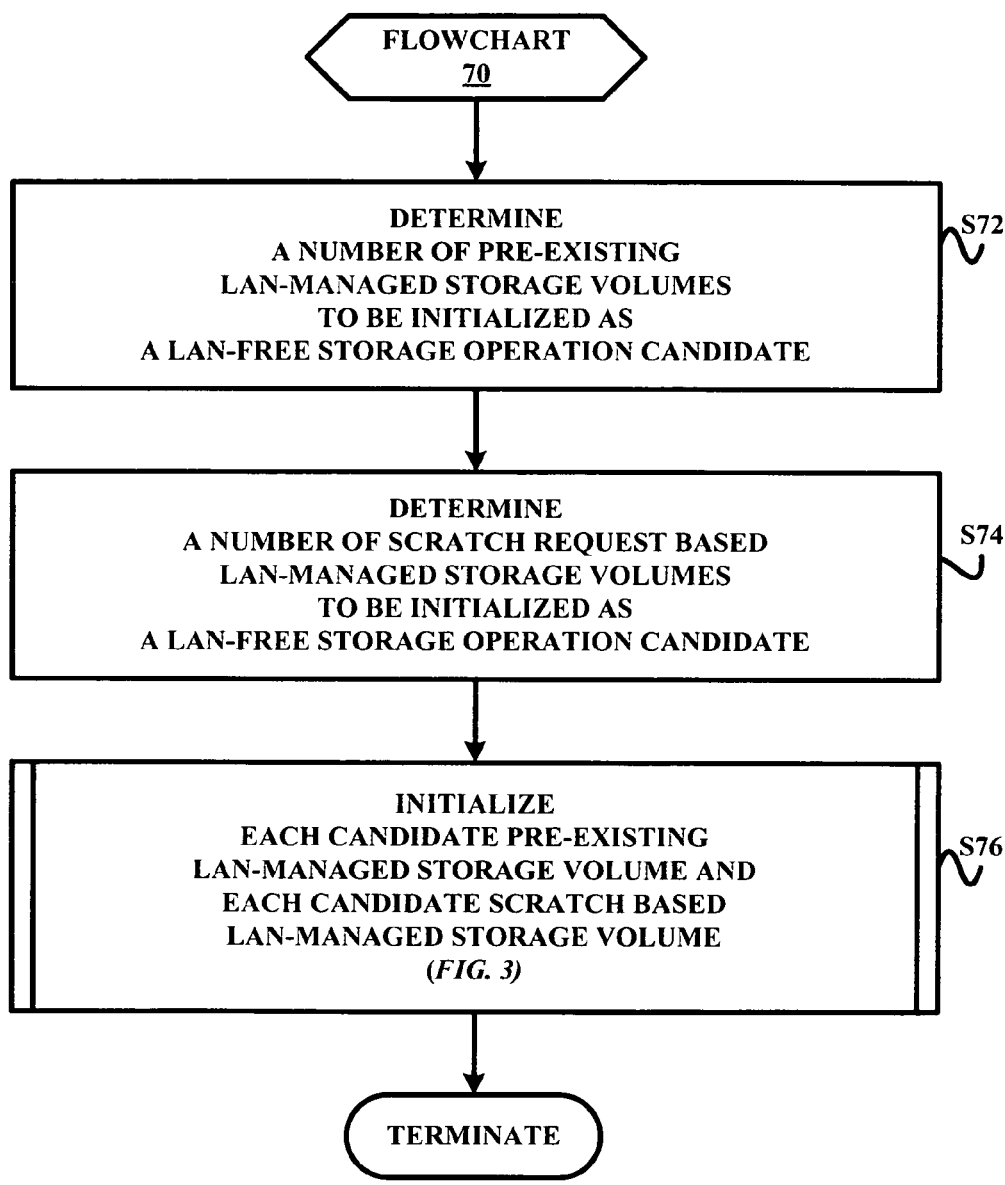
FIG. 2 illustrates a flowchart representative of one embodiment of a static storage volume initialization method in accordance with the present invention.

Referring to FIGS. 1 and 2, a stage S72 of flowchart 70 encompasses LAN manager 31 determining a number of pre-existing LAN-managed storage volumes among tape volumes V1-VX to be initialized as a candidate for a future LAN-free storage operation and a stage S74 of flowchart 70 encompasses LAN manager 31 determining a number of scratch based LAN-managed storage volumes among tape volumes V1-VX to be initialized as a candidate for a future LAN-free storage operation. In practice, the manner by which LAN manager 31 implements stages S72 and S74 is without limit. In one embodiment, LAN manager 31 is provided with a command listing the pre-existing LAN-managed storage volumes among tape volumes V1-VX to be initialized as a candidate for a future LAN-free storage operation, and specifying a quantity of scratch based LAN-managed storage volumes among tape volumes V1-VX to be initialized as a candidate for a future LAN-free storage operation.

Figure 3:
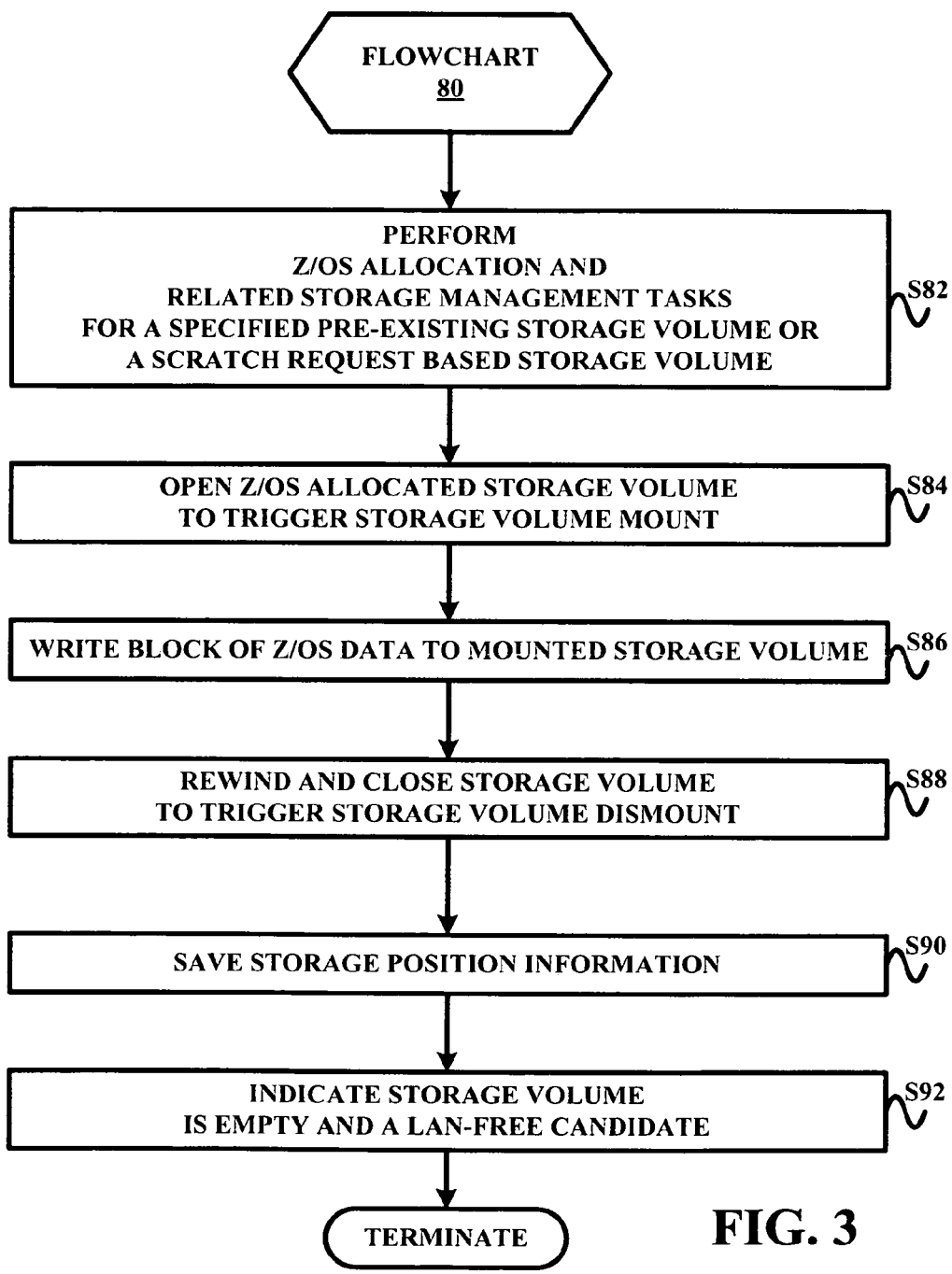
FIG. 3 illustrates a flowchart representative of one embodiment of a z/OS volume initialization method in accordance with the present invention.

A stage S76 of flowchart 70 encompasses LAN manager 31 initializing each candidate pre-existing LAN-managed storage volume and each candidate scratch based LAN-managed storage volume among tape volumes V1-VX. In practice, the manner by which LAN manager 31 implements stage S76 is without limit. In one embodiment, LAN manager 31 implements stage S76 in the context of server 31 being a z/OS based server. FIG. 3 illustrates a flowchart 80 representative of the z/OS embodiment of stage S76.

Referring to FIGS. 1 and 3, a stage S82 of flowchart 80 encompasses LAN manager 31 performing a z/OS allocation and related tasks as would be appreciated by those having ordinary skill in the art for one of tape volumes V1-VX, where each tape volume V1-VX is either a pre-existing tape volume having a volume name or a scratch based tape volume. A stage S84 of flowchart 80 encompasses LAN manager 31 requesting library manager 50 to open the allocated tape volume of stage S84 to trigger a mounting of the allocated tape volume to one of the LAN drives 41 by changer 43. A stage S86 of flowchart 80 encompasses a writing by LAN manager 31 of a z/OS data block to the allocated tape volume as mounted on one of the LAN drives 41.

A stage S88 of flowchart 80 encompasses LAN manager 31 rewinding and closing the allocated tape volume to trigger a dismounting of the allocated tape volume from the LAN drive 41. A stage S90 of flowchart 80 encompasses LAN manager 31 saving tape position information corresponding to the allocated tape volume in database 32. A stage S92 of flowchart 80 encompasses LAN manager 31 indicating in database 32 via the volume name that the allocated tape volume is empty and a LAN-free candidate.

Upon termination of flowchart 80, the allocated tape volume(s) among tape volumes V1-VX will be prepared to participate in a future LAN-free storage operation initiated by server 10. Those having ordinary skill in the art will appreciate that LAN manager 31 will repeatedly implement flowchart 80 as commanded via flowchart 70 to thereby obtain a set of LAN-free storage candidates prior to any initiation of a LAN-free storage operation by server 10.

Figure 4:
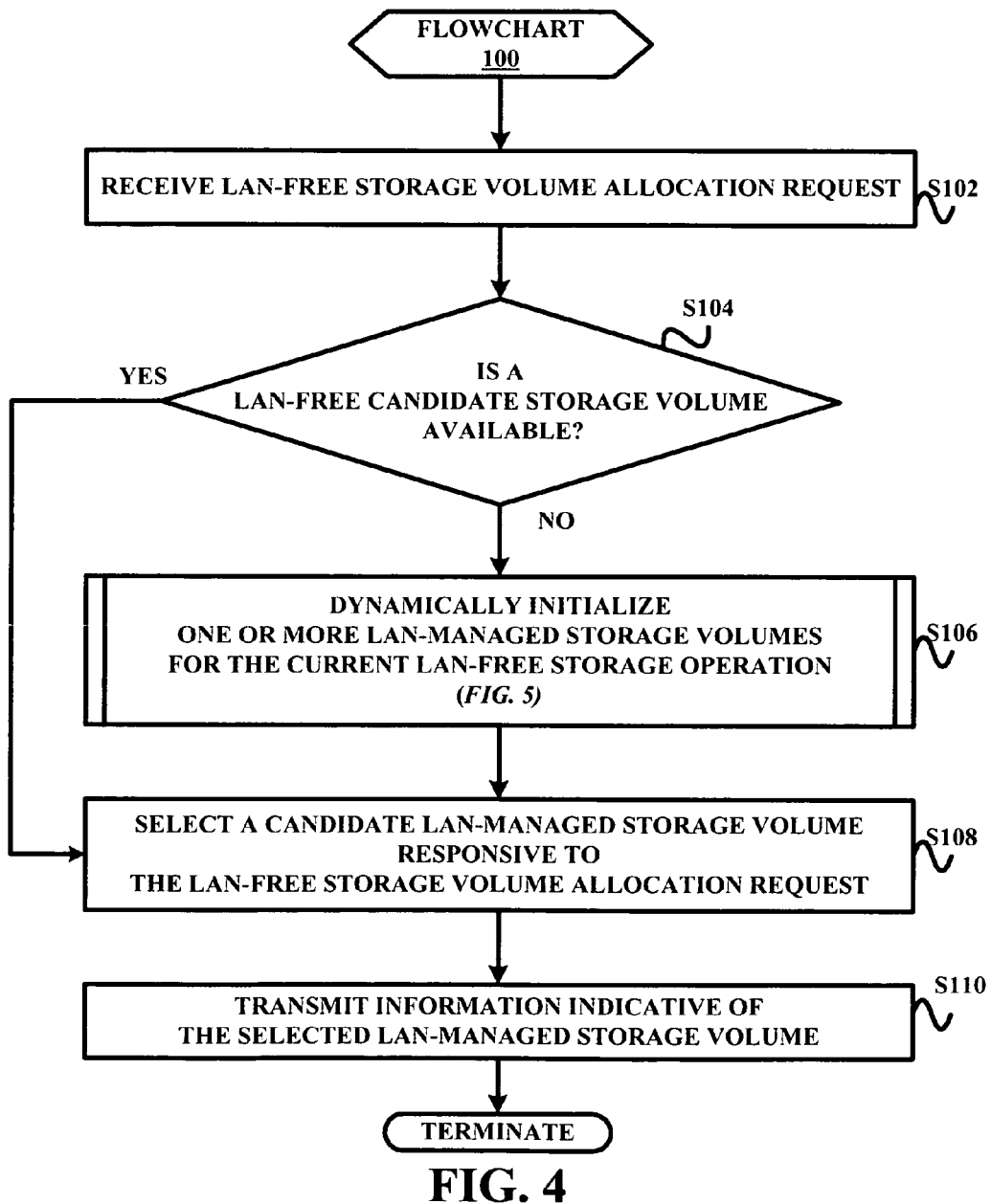
FIG. 4 illustrates a flowchart representative of one embodiment of a LAN-managed storage volume selection method in accordance with the present invention.

FIG. 4 illustrates a flowchart 100 representative of a LAN-managed storage volume selection method of the present invention. Referring to FIGS. 1 and 4, a stage S102 of flowchart 100 encompasses LAN manager 31 receiving a LAN-free storage volume allocation request, and a stage S104 of flowchart 100 encompasses LAN manager 31 searching database 32 for listing of one or more tape volumes marked as a LAN-free candidate during a previous implementation of flowchart 70 (FIG. 2). If a tape volume marked as a LAN-free candidate is listed in database 32, then LAN manager 31 sequentially proceeds to a stage S108 of flowchart 100 to select the tape volume that is responsive to the LAN-free storage volume allocation request (e.g., a tape volume complying with one or more policies associated with honoring the request) and a stage S110 of flowchart 100 to transmit information to server 10 indicative of the selected tape volume (e.g., a volume serial name of the selected tape volume and a library name of tape library 40).

Figure 5:
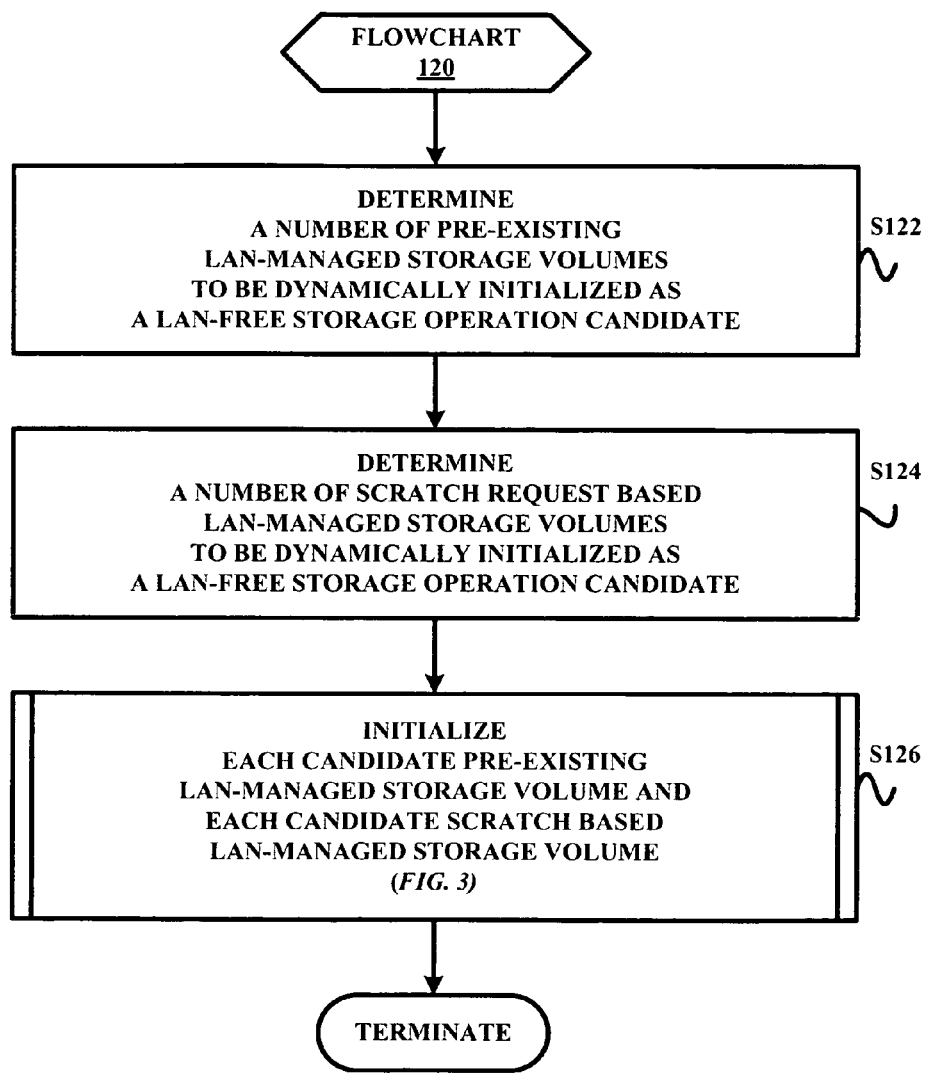
FIG. 5 illustrates a flowchart representative of one embodiment of a dynamic tape volume initialization method in accordance with the present invention.

Otherwise, LAN manager 31 proceeds to a stage S106 of flowchart 100 to dynamically initialize one or more tape volumes among tape volumes V1-VX as a LAN-free storage operation candidate. FIG. 5 illustrates flowchart 120, which is representative of one embodiment of stage S106. Referring to FIGS. 1 and 5, a stage S122 of flowchart 120 encompasses LAN manager 31 determining a number of pre-existing LAN-managed storage volumes among tape volumes V1-VX to be initialized as a candidate for the current LAN-free storage operation and a stage S124 of flowchart 120 encompasses LAN manager 31 determining a number of scratch based LAN-managed storage volumes among tape volumes V1-VX to be initialized as a candidate for the current LAN-free storage operation. In practice, the manner by which LAN manager 31 implements stages S122 and S124 is without limit. In one embodiment, LAN manager 31 applies a policy for targeting a candidate target volume for the current LAN-free storage operation as well as initializing other target volumes for future LAN-free storage operations.

A stage S126 of flowchart 120 encompasses LAN manager 31 initializing each candidate pre-existing LAN-managed storage volume and each candidate scratch based LAN-managed storage volume among tape volumes V1-VX. In practice, the manner by which LAN manager 31 implements stage S126 is without limit. In one embodiment, LAN manager 31 implements stage S126 in the context of server 31 being a z/OS based server. Flowchart 80 as illustrated in FIG. 3 is a representative of the z/OS embodiment of stage S126.

Referring again to FIGS. 1 and 4, upon completion of stage S106, LAN manager 31 sequentially proceeds to stage S108 to select the targeted tape volume of stage S106 that is responsive to the LAN-free storage volume allocation request and stage S110 to transmit information to server 10 indicative of the selected tape volume (e.g., a volume serial name of the allocated tape volume and a library name of tape library 40).

Figure 6:
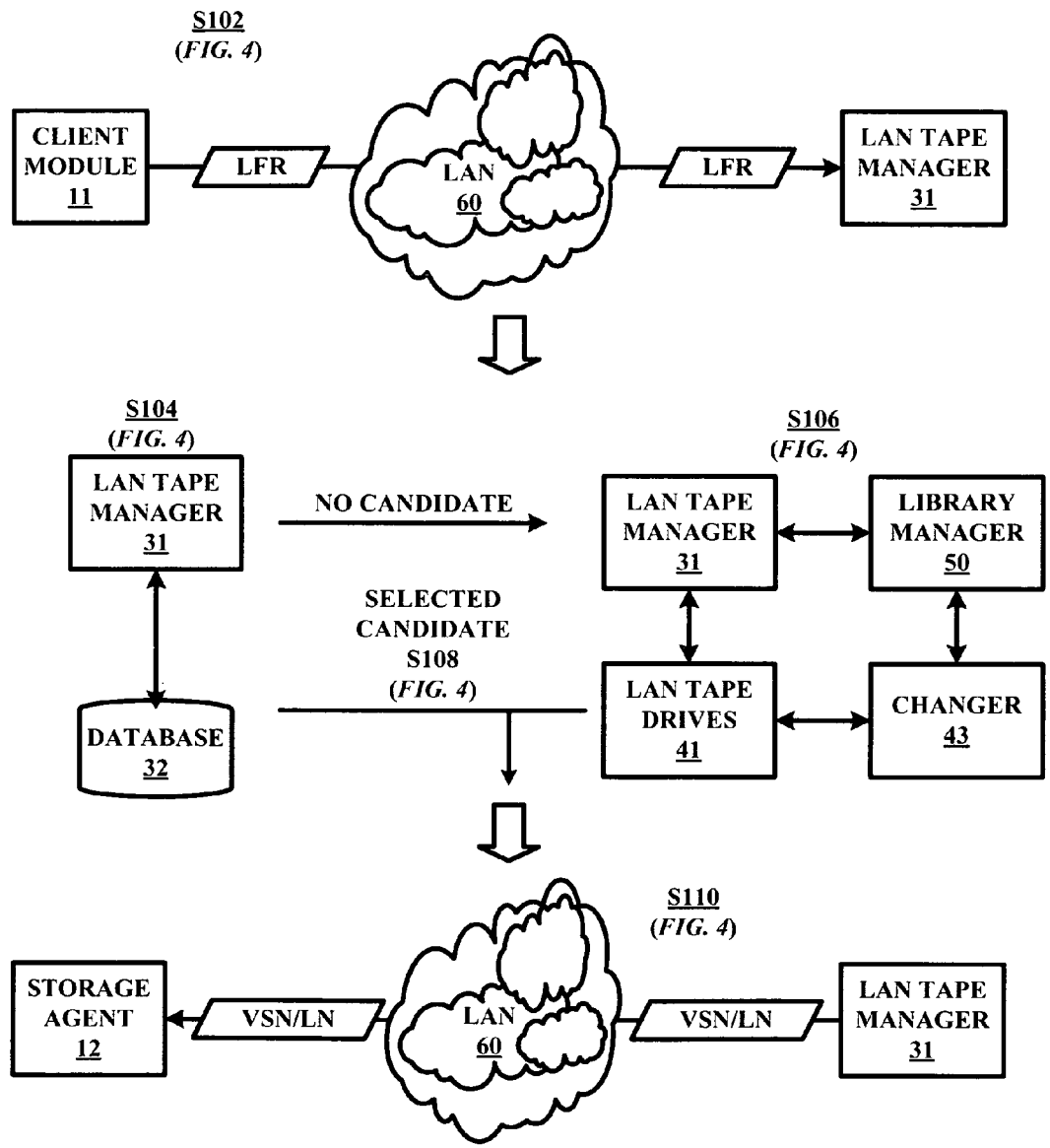
FIG. 6 illustrates an exemplary execution of the flowchart illustrated in FIG. 4.

An overall execution of a LAN-free storage operation of the present invention in the context of FIG. 1 will now be described herein. FIG. 6 illustrates an execution of flowchart 100 (FIG. 4) during the LAN-free storage operation. Specifically, during a stage S102, LAN manager 31 receives a LAN-free storage volume allocation request LFR via LAN 60 from client module 11. Those having ordinary skill in the art will appreciate that a tape volume marked as a LAN-free storage operation candidate may be available and listed in database 32 from an implementation of flowchart 70 (FIG. 2) or flowchart 120 (FIG. 5) prior to LAN manager receiving the LAN-free request LFR from client module 11 during stage S102. If so, then LAN manager 31 will select a candidate during a stage S108 as shown. If not, then LAN manager 31 will sequentially proceed to stage S106 to dynamically initialize one or more tape volumes as LAN-free storage operation candidates in accordance with flowchart 120 (FIG. 5) and to stage S108 to select one the dynamically initialized tapes volumes. Irrespective of how a tape volume became a selected LAN-free candidate responsive to request LFR, LAN manager 31 will transmit a volume serial name/library name VSN/LN associated with the selected tape volume via LAN 60 to storage agent 12 during stage S110.

Figure 7:
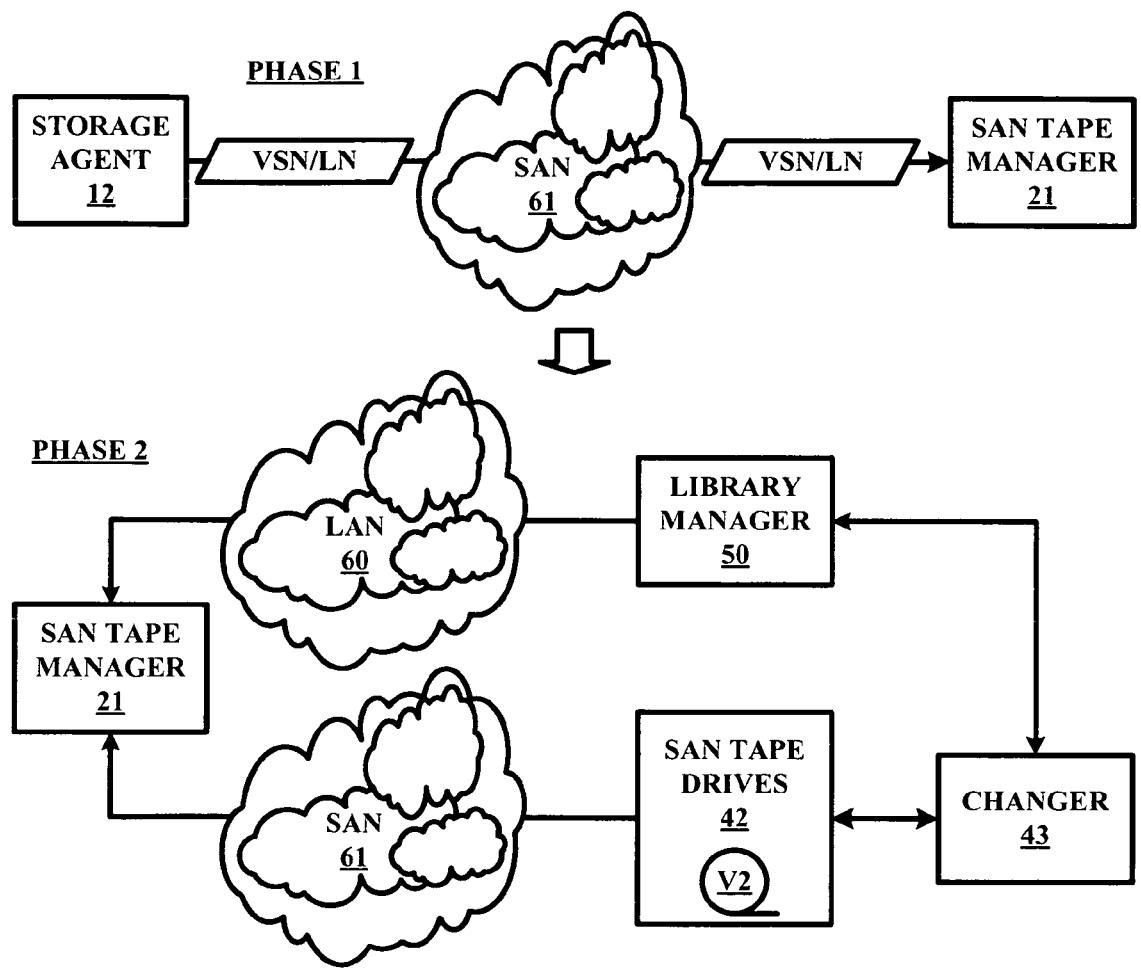
FIG. 7 illustrates an exemplary LAN-free storage volume mount segment of a LAN-free storage operation in accordance with the present invention.

FIG. 7 illustrates a LAN-free tape volume mount segment of the LAN-free storage operation. Specifically, during a phase 1 of the LAN-free tape volume mount segment, storage agent 12 transmits the volume serial name/library name VSN/LN associated with the allocated tape volume via SAN 61 to SAN manager 21. In response thereto, during a phase 2 of the LAN-free tape volume mount segment, SAN manager 21 will trigger a mounting of the allocated tape volume onto SAN tape drives 42, such as, for example, tape volume V2 as shown.

Figure 8:
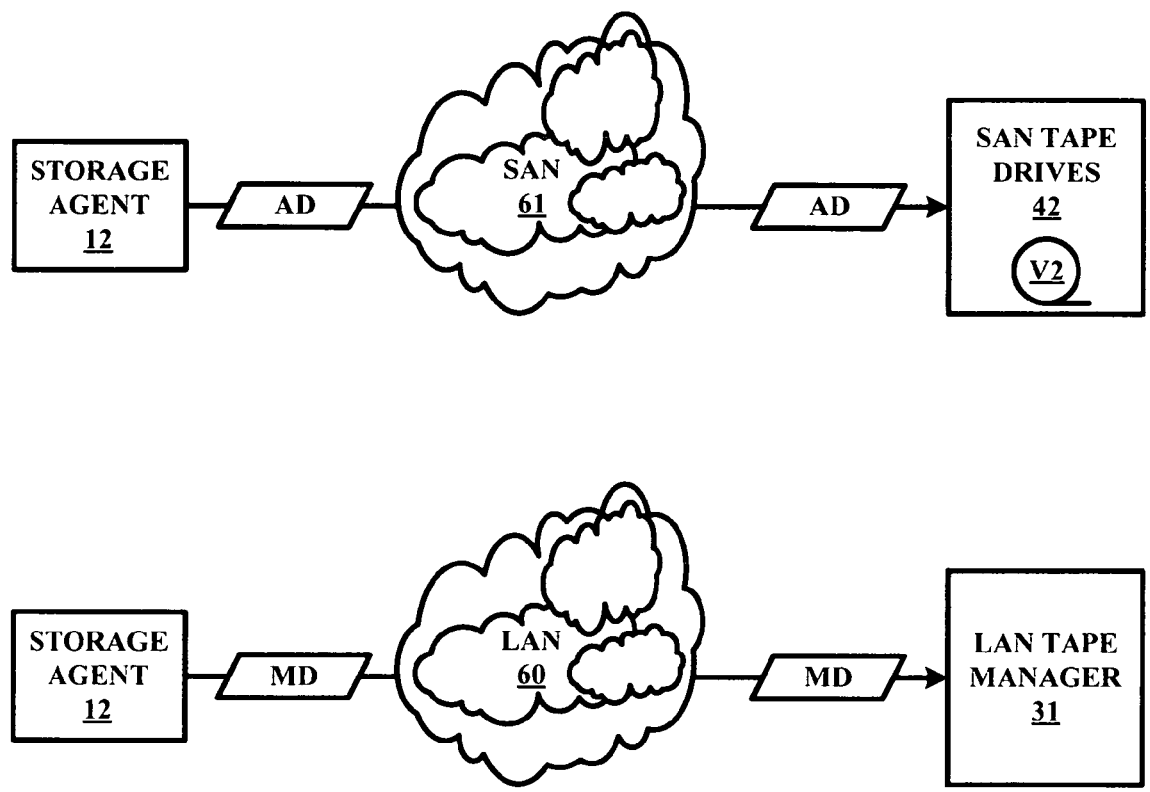
FIG. 8 illustrates an exemplary LAN-free data writing segment of a LAN-free storage operation in accordance with the present invention.

FIG. 8 illustrates a LAN-free data writing segment of the LAN-free storage operation. During this segment, storage agent 12 transmits application data AD via SAN 61 for storage unto the allocated tape volume (e.g., tape volume V2) and transmits metadata MD via LAN 60 to LAN manager 31 for storage in database 32.

From the preceding description of FIGS. 1-8, those having ordinary skill in the art will appreciate numerous advantages of the present invention. Foremost among such advantages is the efficient manner of initializing storage volumes (e.g., tape volumes) to be LAN-free candidates.

In one practical embodiment, client module 11, storage agent 12, SAN manager 21 and library manager 50 are conventionally software applications while manager 31 is embodied in a new software module integrated with a commercially available software application entitled "z/OS". As such, manager 31 is installed within a memory of a server 30 whereby the processor(s) of server 30 can execute manager 31 to implement flowcharts 70-120 as exemplary illustrated in FIGS. 2-5, respectively. Manager 31 when embodied as a software module can be written in any conventional programming language by those having ordinary skill in the art appreciating the description herein of FIGS. 2-5.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A memory storing a program of machine-readable instructions executable by at least one processor to perform operations to process a storage volume allocation request, the operations comprising:
   receiving the storage volume allocation request;
   selecting a Local Area Network (LAN)-managed storage volume responsive to the storage volume allocation request;
   opening the LAN-managed storage volume responsive to the storage volume allocation request, the opening triggering a mounting of the LAN-managed storage volume;
   writing a data block to the LAN-managed storage volume;
   closing the LAN-managed storage volume in response to writing the data block, the closing triggering a dismounting of the LAN-managed storage volume;
   saving a position of the LAN-managed storage volume and an indication that the LAN-managed storage volume is empty and LAN-free to a database;
   transmitting information indicative of the LAN-managed storage volume responsive to the storage volume allocation request; and
   transmitting application data to the LAN-managed storage volume via at least one storage area network (SAN).

2. The memory of claim 1, wherein the LAN-managed storage volume is initialized as a candidate for a storage operation in accordance with a z/OS format and the LAN-managed storage volume is directly accessed over the at least one SAN from a storage manager that receives requests over a LAN.

3. The memory of claim 1, wherein the LAN-managed storage volume is initialized as a candidate for a storage operation prior to receiving the storage volume allocation request.

4. The memory of claim 3, wherein, prior to receiving the storage volume allocation request, the operations further comprise:
   determining a number of pre-existing LAN-managed storage volumes as being eligible to be initialized as a candidate for a storage operation.

5. The memory of claim 4, wherein, prior to receiving the storage volume allocation request, the operations further comprise:
   initializing at least one pre-existing LAN-managed storage volume as a candidate for a storage operation in accordance with a z/OS format.

6. The memory of claim 3, wherein, prior to receiving the storage volume allocation request, the operations further comprise:
   determining a number of scratch LAN-managed storage volumes as being eligible to be initialized as a candidate for a storage operation, wherein the scratch LAN-managed storage volumes are not pre-existing storage volumes.

7. The memory of claim 6, wherein, prior to receiving the storage volume allocation request, the operations further comprise:
   initializing at least one scratch LAN-managed storage volume as a candidate for a storage operation in accordance with a z/OS format.

8. The memory of claim 1, wherein the LAN-managed storage volume is initialized as a candidate for a storage operation in response to receiving the storage volume allocation request.

9. The memory of claim 8, wherein, in response to receiving the storage volume allocation request, the operations further comprise:
   determining a number of pre-existing LAN-managed storage volumes that are eligible to be initialized as a candidate for a storage operation.

10. The memory of claim 9, wherein, in response to receiving the storage volume allocation request, the operations further comprise:
   initializing at least one pre-existing LAN-managed storage volume as a candidate for a storage operation in accordance with a z/OS format.

11. The memory of claim 8, wherein, in response to receiving the storage volume allocation request, the operations further comprise:
   determining a number of scratch LAN-managed storage volumes as being eligible to be initialized as a candidate for a storage operation, wherein the scratch LAN-managed storage volumes are not pre-existing storage volumes.

12. The memory of claim 11, wherein, in response to receiving the storage volume allocation request, the operations further comprise:
   initializing at least one scratch LAN-managed storage volume as a candidate for a storage operation in accordance with a z/OS format.

13. A system, comprising:
   at least one processor; and
   at least one memory storing instructions operable with the at least one processor for processing a storage volume allocation request, the instructions being executed for:
   receiving the storage volume allocation request;
   selecting a LAN-managed storage volume responsive to the storage volume allocation request;
   opening the LAN-managed storage volume responsive to the storage volume allocation request, the opening triggering a mounting of the LAN-managed storage volume;
   writing a data block to the LAN-managed storage volume;
   closing the LAN-managed storage volume in response to writing the data block, the closing triggering a dismounting of the LAN-managed storage volume;
   saving a position of the LAN-managed storage volume and an indication that the LAN-managed storage volume is empty and LAN-free to a database;
   transmitting information indicative of the LAN-managed storage volume responsive to the storage volume allocation request; and
   transmitting application data to the LAN-managed storage volume via at least one storage area network (SAN).

14. The system of claim 13, wherein the LAN-managed storage volume is initialized as a candidate for a storage operation in accordance with a z/OS format and the LAN-managed storage volume is directly accessed over the at least one SAN from a storage manager that receives requests over a LAN.

15. The system of claim 13, wherein the LAN-managed storage volume is initialized as a candidate for a storage operation prior to receiving the storage volume allocation request.

16. The system of claim 15, wherein, prior to receiving the storage volume allocation request, the operations further comprise:
   determining a number of pre-existing LAN-managed storage volumes as being eligible to be initialized as a candidate for a storage operation.

17. The system of claim 16, wherein, prior to receiving the storage volume allocation request, the operations further comprise:
   initializing at least one pre-existing LAN-managed storage volume as a candidate for a storage operation in accordance with a z/OS format.

18. The system of claim 15, wherein, prior to receiving the storage volume allocation request, the operations further comprise:
   determining a number of scratch LAN-managed storage volumes as being eligible to be initialized as a candidate for a storage operation, wherein the scratch LAN-managed storage volumes are not pre-existing storage volumes.

19. The system of claim 18, wherein, prior to receiving the storage volume allocation request, the operations further comprise:
   initializing at least one scratch LAN-managed storage volume as a candidate for a storage operation in accordance with a z/OS format.

20. The system of claim 13, wherein the LAN-managed storage volume is initialized as a candidate for a storage operation in response to receiving the storage volume allocation request.

21. The system of claim 20, wherein, in response to receiving the storage volume allocation request, the operations further comprise:
   determining a number of pre-existing LAN-managed storage volumes as being eligible to be initialized as a candidate for a storage operation.

22. The system of claim 21, wherein, in response to receiving the storage volume allocation request, the operations further comprise:
   initializing at least one pre-existing LAN-managed storage volume as a candidate for a storage operation in accordance with a z/OS format.

23. The system of claim 20, wherein, in response to receiving the storage volume allocation request, the operations further comprise:
   determining a number of scratch LAN-managed storage volumes that are eligible to be initialized as a candidate for a storage operation, wherein the scratch LAN-managed storage volumes are not pre-existing storage volumes.

24. The system of claim 23, wherein, in response to receiving the storage volume allocation request, the operations further comprise:
   initializing at least one scratch LAN-managed storage volume as a candidate for a storage operation in accordance with a z/OS format.

25. A server for processing a storage volume allocation request, the server comprising:
   means for receiving a storage volume allocation request;
   means for selecting a LAN-managed storage volume responsive to the storage volume allocation request;
   means for opening the LAN-managed storage volume responsive to the storage volume allocation request, the opening triggering a mounting of the LAN-managed storage volume;
   means for writing a data block to the LAN-managed storage volume;
   means for closing the LAN-managed storage volume in response to writing the data block, the closing triggering a dismounting of the LAN-managed storage volume;

means for saving a position of the LAN-managed storage volume and an indication that the LAN-managed storage volume is empty and LAN-free to a database;
means for transmitting information indicative of the LAN-managed storage volume responsive to the storage volume allocation request; and means for transmitting application data to the LAN-managed storage volume via at least one storage area network.

\* \* \* \* \*